(12) United States Patent
Taylor et al.

(10) Patent No.: US 7,475,031 B1
(45) Date of Patent: Jan. 6, 2009

(54) COMMUNICATION INTERFACE FOR PROVIDING ACCOUNTING SUPPORT FOR PRINT SERVICES

(75) Inventors: F. Devon Taylor, Pleasant Grove, UT (US); Bart Dahneke, Provo, UT (US); Dale J Bethers, Pleasant Grove, UT (US); Brad P. Christensen, Alpine, UT (US)

(73) Assignee: Novell, Inc., Provo, UT (US)

( * ) Notice: Subject to any disclaimer, the term of this patent is extended or adjusted under 35 U.S.C. 154(b) by 593 days.

(21) Appl. No.: 09/390,954

(22) Filed: Sep. 7, 1999

(51) Int. Cl.
*G07B 17/00* (2006.01)
(52) U.S. Cl. .......................... 705/30; 399/79
(58) Field of Classification Search ............ 705/30
See application file for complete search history.

(56) References Cited

U.S. PATENT DOCUMENTS

| 5,136,468 A | * | 8/1992 | Wong et al. ............... 361/683 |
| 5,146,344 A | * | 9/1992 | Bennett et al. ............. 358/296 |
| 5,148,389 A | * | 9/1992 | Hughes ..................... 710/9 |
| 5,227,957 A | * | 7/1993 | Deters ...................... 361/686 |
| 5,251,150 A | * | 10/1993 | Ladner et al. ............... 702/127 |
| 5,579,447 A | * | 11/1996 | Salgado ..................... 358/1.9 |
| 5,592,561 A | * | 1/1997 | Moore ....................... 382/103 |
| 6,101,500 A | | 8/2000 | Lau |
| 2004/0012807 A1 | * | 1/2004 | Konishi ..................... 358/1.15 |

FOREIGN PATENT DOCUMENTS

JP  2001043053  * 2/2001

OTHER PUBLICATIONS

Cullen, Cheryl Dangel, JDF in the Graphic Arts, Digital Output, v11 n6 pd16(4), ISSN: 1083-5121.*

Mark McKell et al., *An Introduction to Novell Distributed Print Services (NDPS)*, Apr. 1998, pp. 3-13.
Mark McKell, *Printing in NetWare 5 with NDPS 2.01*, Sep. 1998, pp. 81-96.
Bob Ross, et al., NetWare Print Services, Technical Development Conferences, 3-92, pp. API-8—API-14.
Spencer Cottam, et al., *Optimizing Printing with NetWare 4.x and 3.1x*, Sep. 1993, pp. 1-17.
Scott Isaacson, *NetWare Distributed Print Services (NDPS) Architecture Overview*, 1996, pp. 67-73.
Edward Liebing, *NetWare 4 Printing From the Ground Up*, Sep./Oct. 1995, pp. 32-43.
Edward Liebing, *NetWare 4.1 Print Services, An Architectural Overview*, Jul./Aug. 1995, pp. 44-51.
Edward Liebing, et al., *Understanding and Troubleshooting Novell's Print Services*, May 1992, pp. 1-20.

(Continued)

Primary Examiner—F. Zeender
Assistant Examiner—Paul Danneman
(74) Attorney, Agent, or Firm—Schwegman, Lundberg & Woessner, P.A.

(57) ABSTRACT

An application-to-application communication interface between an accounting service application and a printer agent application resides on a computer network. The interface is embodied as novel application programming interface (API) functions or calls between the applications that provide accounting support for print services, including tracking the production of print jobs and the resources consumed by those jobs. The accounting support services provided by the novel API communication interface facilitate computing of charges by the accounting application for print services and materials used by print clients.

17 Claims, 3 Drawing Sheets

OTHER PUBLICATIONS

Craig Whittle, *NetWare Distributed Print Services (NDPS) Server Architecture and Information Model*, 1996, pp. 82-88.

Roy Studyvin, *Developing Smart Client Applications for NetWare Distributed Print Services (NDPS)*, 1996, pp. 98-101.

Dale Bethers, *NDPS Interoperability Issues with Legacy Printing Systems and Printers*, 1996, pp. 104-108.

Roy Studyvin, et al., *Adding Value to Applications Using NetWare Distributed Print Services (NDPS)*, 1996, pp. 76-80.

Hugo Parra, *NDPS Brokered Services for the Smart Global Network*, 1996, pp. 90-96.

* cited by examiner

COMMUNICATION INTERFACE FOR PROVIDING ACCOUNTING SUPPORT FOR PRINT SERVICES

FIELD OF THE INVENTION

The invention relates generally to print services that are available on a computer network and, more specifically, to a method and apparatus for efficiently providing accounting support for such network-based print services.

BACKGROUND OF THE INVENTION

Computer hardware is becoming increasingly distributed and remote, resulting in networks of computers for providing services and solving problems in concert rather than as stand-alone systems. Although such distributed services networks generally facilitate problem solving, they also increase the need for flexibility and functionality in software executing on the computers. An example of a distributed services computer network is a client-server system comprising a collection of client nodes, e.g., workstations or personal computers, that communicate over a network with various server nodes. The servers are typically computers having hardware and software elements that provide a set of services, or operations, for use by the clients in order to increase the efficiency of their operations.

Several types of networks, including local area networks (LANs), may be employed in the client-server system. A LAN is a limited area network that typically consists of a transmission medium for interconnecting the client and server nodes. The nodes coupled to the network typically communicate by exchanging discrete frames or packets of data according to predefined protocols. In this context, a protocol consists of a set of rules defining how the nodes interact with each other. Communication in the client-server system typically takes the form of frame or packet exchanges, wherein the clients send requests to the servers, which perform their services and communicate results back to the clients. A typical service provided by a server is a conventional queue-based printing service.

Queue-based print services are generally based upon the creation and linking of three components: a printer, print queues and a print server. Setting up a queue-based printing system is a complicated task requiring a user on a client node to install a printer driver and then "capture" a port to a printer. Broadly stated, software executing on the client submits a print job into a first queue on the print server where an accounting service retrieves the job to perform bill processing. Thereafter, the job is loaded into a second queue where it is stored while waiting to be serviced by the printer. The accounting service logic executing on the print server examines the data stream of the print job to determine resource consumption for billing purposes (e.g., billing for sheets of paper or data printed).

While this complicated queue-based printing system works well, it is rather time consuming and inefficient in terms of resource consumption. Specifically, the accounting service software on the print server must examine the data stream of a print job in order to perform the appropriate accounting function. In addition, queue-based printing requires insertion and retrieval of print jobs to and from a plurality of queue structures. Such an approach is inefficient in terms of the use of client and server resources since read and write operations associated with the various data structures consume those resources.

SUMMARY OF THE INVENTION

The invention comprises an application-to-application communication interface between an accounting service application and a printer agent application residing on a computer network. The interface is preferably embodied as novel application programming interface (API) functions or calls between the applications that provide accounting support for print services, including tracking the production of print jobs and the resources consumed by those jobs. The accounting support services provided by the novel API communication interface facilitate computing of charges by the accounting application for print services and materials used by print clients.

In the illustrative embodiment, the accounting application and printer agent preferably reside on a print server of the network; however, in an alternate embodiment, each application may reside on a separate network entity. The accounting application registers with the printer agent to provide the agent with, e.g., addresses for the API print service calls. A print client on the network submits print jobs directly to the printer agent rather than into queues as in the conventional queue-based printing system. The novel APIs allow the accounting service application to discover and obtain information about the print jobs as they are created and processed by the printer agent. Such information enables the accounting application to leverage use of functions directed to acquiring and setting attributes for these print jobs, thereby extending the utility of those functions for the accounting application.

According to the invention, the printer agent employs the novel print service APIs (i) before a print job is created, (ii) after the print job is created and (iii) when processing of the print job is complete. Broadly stated, the first print service API is called by the printer agent when the client submits a request to create a print job. The accounting application can either reject the print job, accept the print job or instruct the printer agent to put an accounting hold on the print job. In the latter case, the job does not print until the accounting application removes the hold.

The second print service API is called by the printer agent when the creation of the print job is complete, but before the job is scheduled for printing. This function call is similar to the first API, with the exception that it includes a job identifier so that the accounting application can evaluate and act upon the attributes of the job, and a path to a file directory where corresponding print data is stored. As with the first API, the accounting application can reject the print job, accept the job or instruct the printer agent to put an accounting hold on the job. The third print service API is called by the printer agent when processing and/or printing of the print job is completed. The third function provides a job identifier and a file path to a corresponding document data file associated with the job so that the accounting application can evaluate the completed job and perform any appropriate accounting operations.

Advantageously, the inventive print service APIs provide an extensive set of information about print jobs that is generally more complete than that provided by conventional print systems. In particular, the novel communication interface provides developers with information needed to render decisions about print jobs as requests are received by the printer agent and as print jobs are created and processed.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

Figure 1:
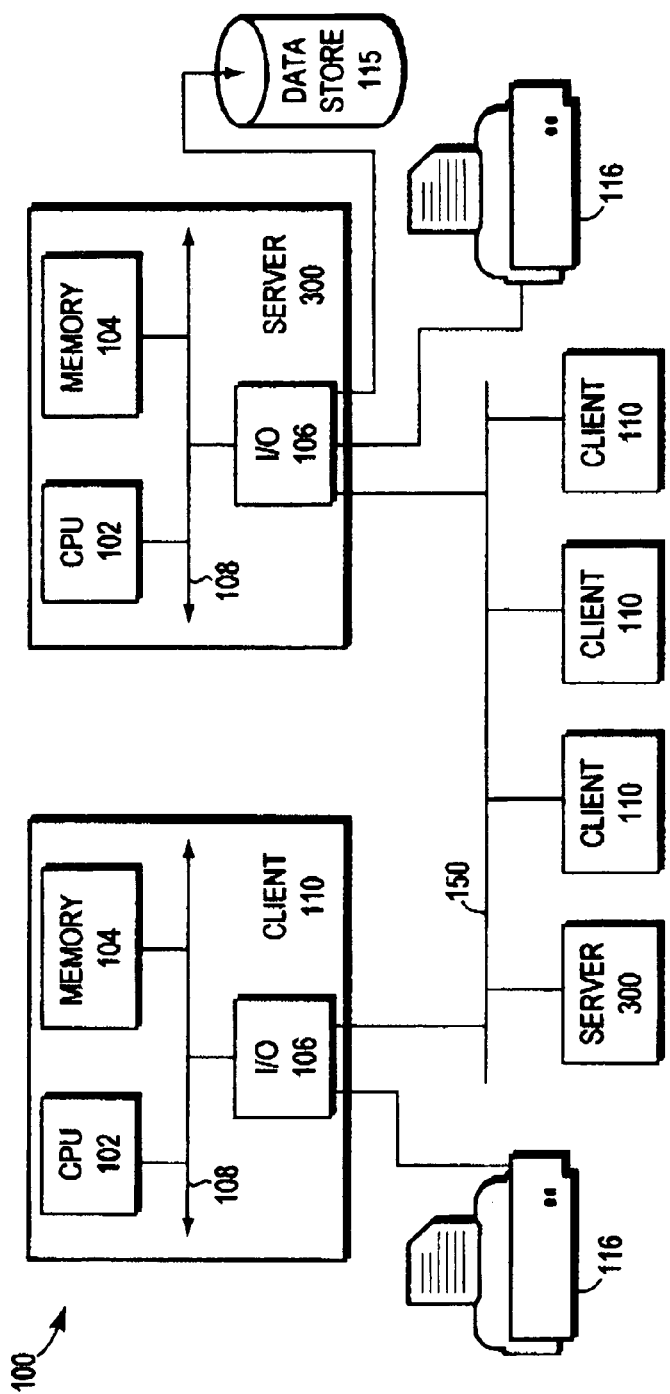
FIG. 1 is a block diagram of a computer network including a collection of interconnected client and server computers.

FIG. 1 is a schematic block diagram of a network 100 comprising a collection of interconnected computers 110, 300. Each computer typically comprises a central processing unit (CPU) 102, a memory unit 104 and an input/output (I/O) unit 106 interconnected by a system bus 108. The memory unit 104 may comprise storage locations typically composed of, e.g., random access memory devices, which are addressable by the CPU 102 and the I/O unit 106. An operating system, portions of which are typically resident in memory and executed by the CPU, functionally organizes the computer by, inter alia, invoking network operations in support of application programs executing on the CPU. It will be apparent to those skilled in the art that other processor and memory means, including various computer readable media, may be used for storing and executing program instructions pertaining to the inventive communication interface and calls described herein.

The I/O unit 106 connects the computer to a transmission medium 150 and to a mass storage device, such as data store 115, and/or a conventional printer 116. The data store 115 may comprise at least one disk configured as a database for storing information relating to, e.g., objects that represent components of a printing architecture that may advantageously used with the present invention. Typically the I/O unit 106 receives information, such as control and data signals, from a keyboard or mouse (not shown) and provides that information to the CPU 102 for storage/retrieval of information from the data store 115, for output to the printer 116 or for transfer over the transmission medium 150.

In the illustrative embodiment, the network 100 is organized in accordance with a client-server architecture wherein computers 110 may comprise personal computers or workstations configured as "clients" for interaction with users and computers 300 are configured as "servers" that perform services as directed by the clients. For example, the server 300 may be configured as a print server having a locally-attached printer 116. In another embodiment of the invention, the printer 116 may be directly-attached to the transmission medium 150.

The transmission medium 150 may comprise a local area network (LAN) or collection of LANs cooperating to form a larger network, such as the Internet. Collectively, the LANs may be configured to form a topology of internetworked computers that communicate by exchanging data packets according to a predefined set of protocols. Communication among the computers may be effected by reliable communication over Transmission Control Protocols/Internet Protocol (TCP/IP) sessions. It should be noted that other conventional techniques and protocols, such as Remote Procedure Calls (RPC) or the Internet Packet Exchange (IPX) protocol, may be advantageously used with the present invention.

Figure 2:
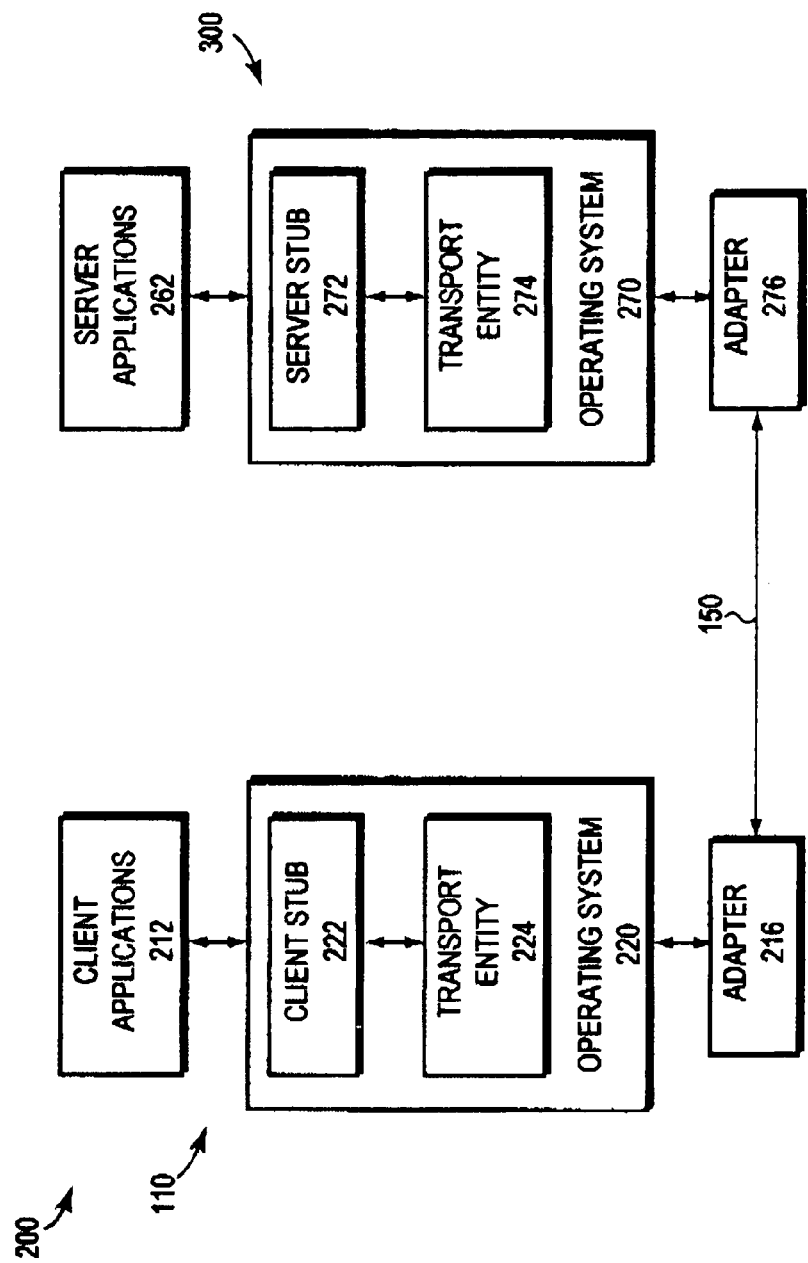
FIG. 2 is a schematic block diagram of a client-server system that may be advantageously used with the present invention.

FIG. 2 is a schematic block diagram of a client-server system 200 that may be advantageously used with the present invention wherein the client node 110 is coupled to the server node 300 by way of transmission medium 150. Resident in each node are application programs 212, 262 and operating systems 220, 270 configured to provide a communication function, such as a RPC function. The RPC function establishes a session between the client and server nodes for execution of a specific service. The RPC is typically embedded in software programs to make a remote call appear "local" to the nodes. Client-server communication thus takes the form of procedure calls utilizing local stub procedures. Specifically, the applications interact with stub procedure software 222, 272 by exchanging parameter requests. Each stub procedure operates to arrange, i.e., "flatten", the parameters into a predetermined message format according to the computer type.

The RPC function initiated by the client application 212 may transfer data or request the server application 262 to perform an operation, such as a print operation. Transport entities 224, 274 are also provided as software processes within transport layers of protocol stacks resident in the nodes. The entity 224 interacts with the stub procedure 222 to receive the message, format it into a packet and pass it to a network adapter 216 for transmission over the medium 150. The transport entities 224, 274 provide a reliable, cost-effective data transport between the client and server, independent of the physical network medium. An example of such reliable transport is the conventional TCP transport mechanism.

When the packet arrives at the server 300, a network adapter 276 passes it to the transport entity 274 and onto the server stub procedure 272, which unflattens the parameters. The stub procedure then calls the server application 262 and passes the parameters in a conventional manner. After completing its work, the application 262 "returns" in a manner that is conventional for local procedure calls, e.g., by returning a result. The stub procedure 272 flattens the result into a message and passes it to the trans-port entity 274, where a reply packet is formed and transferred to the client 110 over the network. Upon receiving the reply packet, the transport entity 224 passes it to the client stub procedure 222 for unflattening. Finally, the stub procedure returns the reply parameters to the client application 212.

Figure 3:
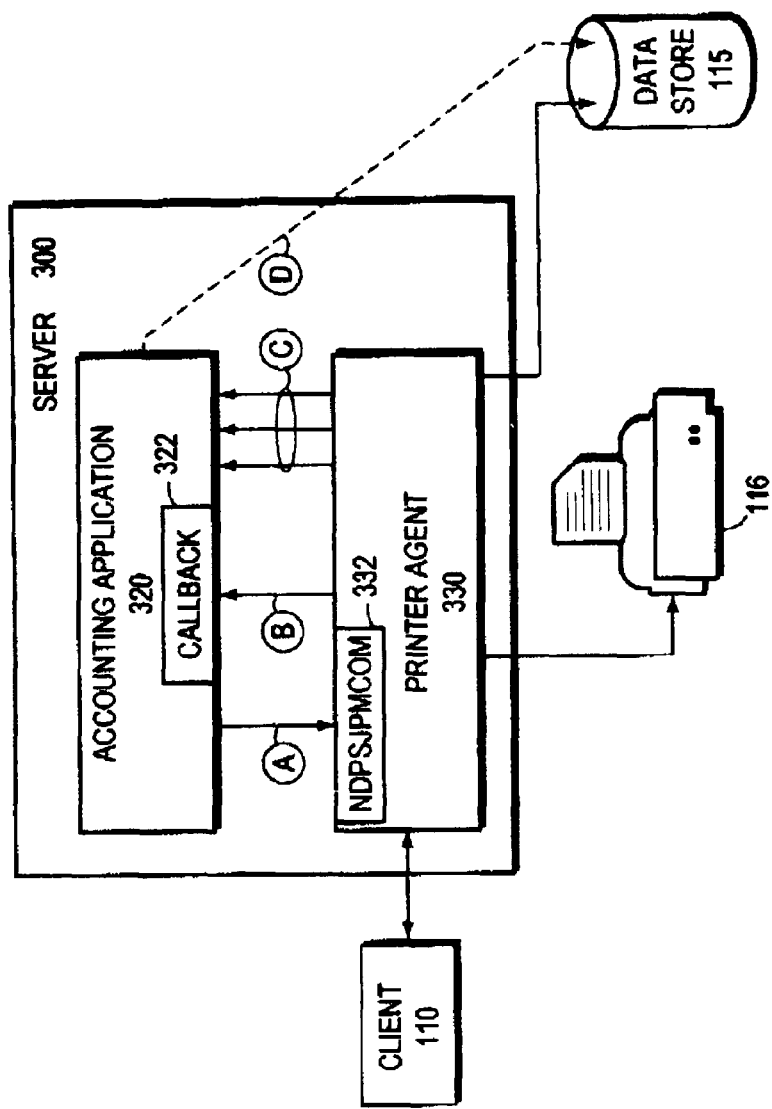
FIG. 3 is a highly schematized diagram of software components of the server computer that may be advantageously used with the present invention.

FIG. 3 is a highly schematized diagram of software application components of the server 300. These application components generally interact with an operating system, such as the NetWare operating system available from Novell, Inc., to provide a print server configured to provide print services to clients 110 of network 100. The application components include an accounting application 320 and a printer agent application 330, the latter of which embodies the printer, print queue and print server functions required for conventional queue-based printing. In an alternate embodiment, the printer agent 330 may be embedded into a printer station, such as printer 116, arranged to attach directly to the network 100.

The printer agent is a primary component of a printing architecture, such as the Novell Distributed Print Services (NDPS) printing architecture. The components of the NDPS architecture are independent of any single protocol or operating system and, as such, may be ported to different operating environments based upon the International Standards Organization 10175 Document Printing Application standard and Internet Engineering Task Force RFC 1759. The printer agent 330 may be implemented as part of a NDPS manager component of the NDPS architecture; the NDPS manager is preferably a NetWare Loadable Module (NLM) that runs on the NetWare print server. The agent 330 may further be embodied as a software application configured to run in other operating environments, such as Windows NT, Windows 9x, DOS, Unix or Linux, or embedded directly into a printer or print server apparatus.

Other components of the NDPS architecture include a printer device subsystem (PDS), a port handler (PH) and a printer gateway, the latter comprising a software bridge that directly links the printer agent to its printers. The PDS is an NLM that resides on the print server 300 and retrieves printer-specific information for local storage on the server. The PDS is used to create a printer agent 330 for a printer that is not directly attached to the network 100 and for a printer that is directly attached to the network, but that does not include an NDPS gateway. The PH ensures that the PDS can communicate with the printer 116 regardless of the type of physical port or interface being used.

The printer agent 330 is also preferably an NLM that contains information about printers it represents. Such information, including a printer's network address, name, status or other characteristics can be communicated to an NDPS client and managed by a system administrator. The printer agent 330 supports central management of printers on the network 100, as well as the creation and management of print jobs. In essence, the printer agent is a liaison between an NDPS client and printer, so that each print job goes from the client 110 to the printer 116 by way of the printer agent 330.

The printer agent 330 preferably utilizes the RPC protocol to receive print job requests from and send replies to the NDPS client 110. As with the print server 300, the client 110 may operate with a variety of operating systems, including Windows NT, Windows 9x, DOS, Unix, Linux or Apple OS. Notwithstanding the actual system platform, the operating environment of the client should include an NDPS library or similar facility that provides the required NDPS support for the client. As noted, the NDPS architecture is preferably protocol-independent and, thus, may support other protocols, such as the Hypertext Transfer Protocol (HTTP), the LPR protocol or the Internet Printing Protocol (IPP), instead of RPC.

According to the invention, an application-to-application communication interface is provided between the accounting application 320 and printer agent 330. The interface is preferably embodied as novel application programming interface (API) functions or calls between the applications that provide accounting support for print services, including tracking the production of print jobs and the resources consumed by those jobs. Print jobs are represented in the NDPS architecture as objects having attributes that describe the characteristics of those jobs, such as the number of printed pages. Print drivers capable of specifying those characteristics enable accounting services based on that information. The accounting support services provided by the novel API communication interface facilitate computing of charges by the accounting application 320 for print services and materials used by print clients 110.

The accounting application 320 registers with the printer agent 330 via a conventional interface to provide the agent with, e.g., addresses for the API printer service calls. This conventional interface further allows an external application, such as a scheduler or gateway, to bind itself to the printer agent. Registering of the accounting application service enables the printer agent to know where to call into the accounting service for the novel API functions. As described herein, a callback interface 322 provides callbacks from the printer agent to the accounting service when a job occurs.

Further to the invention, a print client 110 submits print jobs directly to the printer agent 330 rather than into queues as in the conventional queue-based printing system. The novel APIs allow the accounting service application 320 to discover and obtain information about the print jobs as they are created and processed by the printer agent. Such information enables the accounting application to leverage use of conventional functions directed to acquiring and setting attributes for these print jobs, thereby extending the utility of those conventional functions for the accounting application.

The accounting application 320 may also be provided as an NLM on the NetWare print server 300. There are preferably two ways to launch the accounting application: (i) from a command line of the server and (ii) by populating a printer object that represents the printer agent with the command line information. An example of the command line information is Load Accounting.NLM PA=PAName<optional parameters> where the Accounting.NLM is the name of the accounting program and PAName is the name of the binding printer agent. A ndps-att-accounting-exec-and-params attribute of the printer object that represents the printer agent in the database 115, such as the NDPS Managed Object Database, can be populated with the command line information. When activated, the printer agent 330 launches the accounting application 330 using the information stored in this attribute.

The accounting application 320 binds to the printer agent 330 based on the name that it gets from the command line by calling the function NDPSJPMComm in the printer agent. This function is preferably exported by the printer agent so it can be found by any NLM that needs it. The function prototype is:

nint NDPSJPMComm(nint cmdCode, void *bufferptr)

The cmdCode parameter contains an opcode indicating the operation to be performed by the printer agent; for example, the opcode is JPM_OP_BIND_TO_PA. The bufferPtr parameter points to a BindStruct structure:

```
typedef struct
{
    nint        majorVersion;
    nint        minorVersion;
    nint        objType;
    pnuint16        paNamePtr;
    CallBack    callBackFnPtr;
    nint        handle;
} BindStruct;
```

The objType field of the BindStruct structure is populated with the value OBJ_TYPE_ACCOUNTING that informs the printer agent that the application requesting to bind is an accounting service. The paNamePtr points to the name of the printer agent 330 to which the accounting application is to bind. The callBackFnPtr contains the address of the function that the printer agent calls to unbind with the accounting application. The handle field contains a unique integer value included in any calls from the printer agent 330 to the accounting application 320. This handle identifies the calling printer agent to an accounting service that may be bound to multiple printer agents.

After setting the appropriate information from the BindStruct structure, the printer agent returns the same structure to the accounting application with the following fields modified: callBackFnPtr is set to the address of the printer agent callback function (NDPSJPMComm) and handle is set to the handle that the accounting application includes with calls to the NDPSJPMComm function to identify the intended printer agent for the request.

The accounting application 320 registers one or more of three function pointers with the printer agent 330 by calling the callback function NDPSJPMComm in the printer agent 330. The cmdCode parameter for this operation is preferably JPM_OP_REG_ACCOUNTING_FN_PTRS and the bufferPtr points to a RegisterAccountingFnPtrs structure:

```
typedef nint (*AccountingNoPathFnPtr)(void);
typedef nint (*AccountingWithPathFnPtr)(nint jobId, nuint8 *path);
typedef struct
{
    nint                      paHandle;
    AccountingNoPathFnPtr     callApprovalBeforeDataFnPtr;
    AccountingWithPathFnPtr   callApprovalWithDataFnPtr;
    AccountingWithPathFnPtr   callBillingFnPtr;
    void                      reserved1;
    void                      reserved2;
} RegisterAccountingFnPtrs;
```

According to the invention, the printer agent employs the novel print service APIs (i) before a print job is created, (ii) after the print job is created and (iii) when processing of the print job is complete. Broadly stated, the first print service API is called by the printer agent when the client submits a request to create a print job. The accounting application can either reject the print job, accept the print job or instruct the printer agent to put an accounting hold on the print job. In the latter case, the job does not print until the accounting application removes the hold.

The second print service API is called by the printer agent when the creation of the print job is complete, but before the job is scheduled for printing. This function call is similar to the first API, with the exception that it includes a job identifier so that the accounting application can evaluate and act upon the attributes of the job, and a path to a file directory where corresponding print data is stored. As with the first API, the accounting application can reject the print job, accept the job or instruct the printer agent to put an accounting hold on the job. The third print service API is called by the printer agent when processing and/or printing of the print job is completed. The third function provides a job identifier and a file path to a corresponding document data file associated with the job so that the accounting application can evaluate the completed job and perform any appropriate accounting operations.

As print jobs are submitted to the printer agent 330 from the NDPS client 110, the agent calls each of the three (3) novel API print service functions (assuming the respective function is registered):

1. When a print request is received, the printer agent calls the callApprovalBeforeDataFnPtr function before the print job is created.
   (a) If the accounting application 320 returns a value greater than zero, the printer agent 330 creates the print job with an accounting hold. The print job will not print until the accounting application or some other action removes the hold. This permits the evaluation and/or manipulation of the job after it is created and before it is processed.
   (b) If the accounting application returns a value less than zero, the printer agent rejects the print job and returns the following error code to the client 110: NWDP_SERVICE_ACCTG_SERVICE_ERR.
   (c) If the accounting application returns a value of zero, the printer agent creates the print job without applying any change to the job.

2. When the printer agent 330 finishes creating the print job, it calls the callApprovalWithDataFnPtr before passing the job to the scheduler (not shown). The parameters for this call include a job identifier and a path to a file directory where the document print data is stored. The accounting application 320 can then perform any of the following steps:
   (a) Using the job identifier and the document data file path, it can examine the print data.
   (b) Using the job identifier, it can submit requests to the printer agent to query and modify attributes of Job and Document objects for the respective print job through the NDPSJPMCom interface 332.
   (c) Using the information obtained in Steps a and b, it can generate accounting and/or billing information. This information can be stored in the Job object or can be handled separately by the accounting application.

3. When the printer agent 330 finishes processing the print job, it calls the callBillingFnPtr. The parameters for this call also include the job identifier and path to the file directory where the document print data is stored. The accounting application 320 can perform any of the following steps:
   (a) Using the job identifier and the document data file path, it can examine the print data.
   (b) Using the job identifier, it can submit requests to the printer agent to query and modify attributes of the Job and Document objects for the respective print job through the NDPSJPMCom interface 332. In the case of a printer agent that supports a fairly capable printer, the Job and Document objects contain useful information about the processed job, including the number of sheets of paper consumed, the bytes processed, etc.
   (c) Using the information obtained in Steps a and b, it can generate accounting and/or billing information. This information can be stored in the Job object or can be handled separately by the accounting application.

When the printer agent 330 "shuts down", it issues an UnBind request to the accounting service application 320. Both applications "clean up" their respective association information so that it is safe for either application to unload. The accounting service can also initiate an UnBind request.

In summary, the interaction between the printer agent 330 and accounting application 320 are schematically shown by Steps A-D in FIG. 3. In Step (A) the accounting application 320 calls the printer agent 330 to bind through the NDPSJPMCom interface 332. The printer agent 330 returns a handle for subsequent calls. The accounting application 320 also calls the printer agent 330 to register one or more of the three novel API accounting functions. The accounting application can further call the printer agent to unbind through the NDPSJPMCom interface 332. In Step (B), the printer agent 330 calls is the accounting application 320 through the callback interface 322 to initiate an unbind. In Step (C), the printer agent calls the registered API accounting functions as print jobs are created and processed. Finally, in Step (D), the accounting application 320 can inspect the document print data, if necessary, that is stored on the data store 115.

Advantageously, the inventive print service accounting APIs provide an extensive set of information about print jobs that is generally more complete than that provided by conventional print systems. In particular, the novel communication interface provides developers with information needed to render decisions about print jobs as requests are received by the printer agent and as print jobs are created and processed.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A communication interface between an accounting application and a printer agent application executing on a computer network, the interface comprising:
   application programming interface (API) functions exchanged and bound between applications that provide accounting support services, wherein the accounting support services are directed to a print job, and the print job is directly received by a printer agent from a print client, the printer agent and the accounting support services reside on a server within a network, and wherein the accounting support services include tracking production of the print job and computer network resources consumed by the job, the API functions comprising a first print service API that is called by the printer agent before the print job is created and sent to a printer and that enables the accounting application to one of reject the print job, accept the print job and instruct the printer agent to place an accounting hold on the print job, and wherein the accounting support services are separate and apart from the printer agent and the printer agent is separate and apart from the printer.

2. The communication interface of claim 1 wherein the API functions further comprise a second print service API that is called by the printer agent after the print job is created and before the job is scheduled for processing, the second print service API including (i) a job identifier for use by the accounting application to evaluate and act upon attributes of the job and (ii) a file path to a document data file associated with the job.

3. The communication interface of claim 2 wherein the API functions further comprise a third print service API that is called by the printer agent when processing of the print job is complete, the third print service API including the job identifier and the file path to the document data file associated with the job, the file path used by the accounting application to evaluate the completed job and perform accounting operations.

4. The communication interface of claim 3 wherein the accounting application and printer agent execute on a print server of the computer network, and wherein the API functions facilitate computing of charges by the accounting application for print services and materials used by a print client of the computer network.

5. A method for communicating between applications executing on a computer network, the method comprising the steps of:
   providing an accounting application configured to run on a first device coupled to the network;
   providing a printer agent application configured to run on a second device coupled to the network, the printer agent interacting with a printer on the network and containing information about the printer, and wherein the first and second device reside in a server within the network; and
   exchanging application programming interface (API) function calls and binding the same between applications that provide accounting support services for a print job, and wherein the print job is directed to the printer via the printer agent, the accounting support services include tracking production of the print job and resources consumed by the print job, wherein the accounting support services are separate and apart from the printer agent and the printer agent is separate and apart from the printer, and wherein the print job is received from a print client over the network.

6. The method of claim 5 wherein the first device is a computer and the second device is the printer, and wherein information contained in the printer agent comprises a network address of the printer and a status of the printer.

7. The method of claim 5 wherein the step of exchanging comprises the step of calling a first print service API at the printer agent before the print job is created, the first print service API enabling the accounting application to one of reject the print job, accept the print job and instruct the printer agent to place an accounting hold on the print job.

8. The method of claim 7 wherein the step of exchanging further comprises the step of calling a second print service API at the printer agent after the print job is created and before the job is scheduled for processing, the second print service API including (i) a job identifier for use by the accounting application to evaluate and act upon attributes of the job and (ii) a file path to a document data file associated with the job.

9. The method of claim 8 wherein the step of exchanging further comprises the step of calling a third print service API at the printer agent when processing of the print job is complete, the third print service API including the job identifier and the file path to the document data file with the job, the file path used by the accounting application to evaluate the completed job and perform accounting operations.

10. The method of claim 9 further comprising the step of registering the accounting application with the printer agent to provide the printer agent with addresses for the API print service calls.

11. The method of claim 10 further comprising the steps of, wherein the first and second devices comprises a single print server:
    obtaining information about the print job at the accounting application using the API function calls; and
    using the obtained information to leverage functions directed to acquiring and setting attributes for the print job, thereby extending the utility of the attribute functions for the accounting application.

12. A computer readable medium containing executable program instructions for communicating between applications executing on a computer network, the executable program instructions comprising program instructions for:
    configuring an accounting application to run on the computer, which is a server in a client server network arrangement;
    configuring a printer agent application to run on the computer, the printer agent interacting with a printer on the network and containing information about the printer; and
    exchanging application programming interface (API) function calls and binding the same between applications that provide accounting support for services relating to a print job, which is received by the printer agent and directed to the printer, the accounting support services include tracking production of the print job and computer resources consumed by the print job, and wherein the accounting support services are separate and apart from the printer agent and the printer agent is separate and apart from the printer, and wherein the print job originates from a print client over the network and within the client server network arrangement.

13. The computer readable medium of claim 12 wherein the program instruction for exchanging comprises the program instruction for calling a first print service API at the printer agent before the print job is created, the first print service API enabling the accounting application to one of reject the print job, accept the print job and instruct the printer agent to place an accounting hold on the print job.

14. The computer readable medium of claim 13 wherein the program instruction for exchanging further comprises the program instruction for calling a second print service API at the printer agent after the print job is created and before the job is scheduled for processing, the second print service API including (i) a job identifier for use by the accounting application to evaluate and act upon attributes of the job and (ii) a file path to a document data file associated with the job.

15. The computer readable medium of claim 14 wherein the program instruction for exchanging further comprises the program instruction for calling a third print service API at the printer agent when processing of the print job is complete, the third print service API including the job identifier and the file path to the document data file associated with the job, the file path used by the accounting application to evaluate the completed job and perform accounting operations.

16. The computer readable medium of claim 15 further comprising the program instruction for registering the accounting application with the printer agent to provide the printer agent with the addresses for the API print service calls.

17. The computer readable medium of claim 16 further comprising program instructions for, wherein the computer is a print server:
- obtaining information about the print job at the accounting application using the API function calls; and
- using the obtained information to leverage functions directed to acquiring and setting attributes for the print job, thereby extending the utility of the attribute functions for the accounting application.

* * * * *